(12) United States Patent
Miyagi et al.

(10) Patent No.: US 12,322,030 B2
(45) Date of Patent: Jun. 3, 2025

(54) COMPUTER-READABLE NON-TRANSITORY STORAGE MEDIUM HAVING IMAGE PROCESSING PROGRAM STORED THEREIN, IMAGE PROCESSING APPARATUS, IMAGE PROCESSING SYSTEM, AND IMAGE PROCESSING METHOD

(71) Applicant: NINTENDO CO., LTD., Kyoto (JP)

(72) Inventors: Atsushi Miyagi, Kyoto (JP); Kazuhide Ueda, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 141 days.

(21) Appl. No.: 18/310,175

(22) Filed: May 1, 2023

(65) Prior Publication Data

US 2023/0410406 A1    Dec. 21, 2023

(30) Foreign Application Priority Data

Jun. 16, 2022  (JP) ................................. 2022-097609

(51) Int. Cl.
*G06T 15/04* (2011.01)
*G06T 15/20* (2011.01)
*G06T 15/50* (2011.01)

(52) U.S. Cl.
CPC .............. *G06T 15/04* (2013.01); *G06T 15/20* (2013.01); *G06T 15/503* (2013.01); *G06T 15/506* (2013.01); *G06T 2210/62* (2013.01)

(58) Field of Classification Search
CPC ....... G06T 15/04; G06T 15/20; G06T 15/503; G06T 15/506; G06T 2210/62
See application file for complete search history.

(56) References Cited

U.S. PATENT DOCUMENTS

| 2012/0172127 | A1 | 7/2012 | Kitahara |
| 2012/0313960 | A1 | 12/2012 | Segawa et al. |
| 2019/0005710 | A1* | 1/2019 | Irrgang .................. G06T 15/04 |

FOREIGN PATENT DOCUMENTS

| JP | 2006-252424 | 9/2006 |
| JP | 2010-033297 | 2/2010 |

(Continued)

OTHER PUBLICATIONS

Welsh, Terry. "Parallax mapping with offset limiting: A per-pixel approximation of uneven surfaces." Infiscape Corporation (2004): 1-9. (Year: 2004).*

(Continued)

*Primary Examiner* — Daniel F Hajnik
*Assistant Examiner* — Chris Alejandro Puntier
(74) *Attorney, Agent, or Firm* — Nixon & Vanderhye P.C.

(57) ABSTRACT

A first texture including first color information, a second texture including second color information, and a third texture including height information are managed. The first color information, of the first texture corresponding to a surface of an object, obtained on the basis of a first correspondence relationship is obtained. A second correspondence relationship which is a relationship between the surface of the object and the second texture is corrected on the basis of a relationship between a line-of-sight direction of a virtual camera and orientation of the surface of the object and the height information specified on the basis of a third correspondence relationship, and the second color information is obtained from the second texture on the basis of the corrected second correspondence relationship. Then, a rendering color is determined using the obtained color information, and the surface of the object is rendered.

20 Claims, 16 Drawing Sheets

(56) References Cited

FOREIGN PATENT DOCUMENTS

| | | |
|---|---|---|
| JP | 2011-134101 | 7/2011 |
| JP | 2012141822 A | 7/2012 |
| WO | 02/23484 | 3/2002 |

OTHER PUBLICATIONS

S. Habert, J. Gardiazabal, P. Fallavollita and N. Navab, "RGBDX: First Design and Experimental Validation of a Mirror-Based RGBD X-ray Imaging System," 2015 IEEE International Symposium on Mixed and Augmented Reality, Fukuoka, Japan, 2015, pp. 13-18, doi: 10.1109/ISMAR.2015.17. (Year: 2015).*

* cited by examiner

PORTION WHERE SECOND COLOR AT "EDGE" IN SECOND TEXTURE IS BLENDED

PORTION WHERE SECOND COLOR AT "EDGE" IN SECOND TEXTURE IS BLENDED

F I G. 1 7
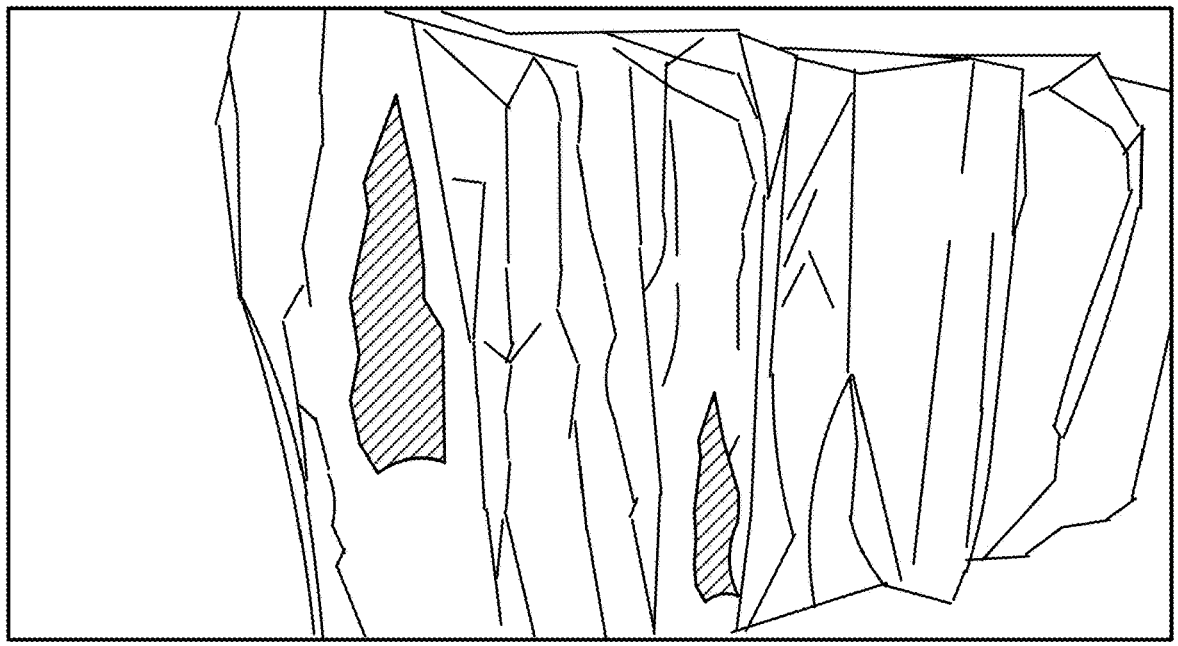
F I G. 1 8

COMPUTER-READABLE NON-TRANSITORY STORAGE MEDIUM HAVING IMAGE PROCESSING PROGRAM STORED THEREIN, IMAGE PROCESSING APPARATUS, IMAGE PROCESSING SYSTEM, AND IMAGE PROCESSING METHOD

CROSS REFERENCE TO RELATED APPLICATION

This application claims priority to Japanese Patent Application No. 2022-097609 filed on Jun. 16, 2022, the entire contents of which are incorporated herein by reference.

FIELD

The present disclosure relates to image processing for representing a three-dimensional object having a sense of transparency.

BACKGROUND AND SUMMARY

Hitherto, as one of techniques for rendering a three-dimensional virtual object, there has been a technique called texture mapping, in which an object is rendered such that a texture image is attached to the object.

The above texture mapping can enhance the expressiveness of the surface texture of the object. However, in some cases, this technique is not sufficient to represent objects having a sense of transparency such as an object having a translucent surface. Therefore, when rendering an object having a sense of transparency, it is common to perform transparency processing using, for example, an alpha blending method or the like. However, the conventional transparency processing generally has a high processing load. For example, the case where the surface of a first object is transparent and a second object on the far side of the first object is seen therethrough, is assumed. In this case, first, the second object which is an object that is seen through the first object is rendered. Next, the first object which is a translucent object is rendered so as to be placed on the near side of the second object. Or, the translucent first object is rendered so as to be placed over the second object. At this time, the first object is also rendered such that various effects are applied to a surface portion of the first object. In addition, the second object may also be rendered such that an effect distorting an image is applied thereto. In such processing, the order in which the objects are rendered is important, but in general, the management of this order is complicated, and the processing load increases due to interference of the rendering order. As a result, a corrupted image may be displayed in some cases.

Therefore, an object of the present disclosure is to provide a computer-readable non-transitory storage medium having an image processing program stored therein, an image processing apparatus, an image processing system, and an image processing method which can represent an object having a sense of transparency with a low processing load.

In order to attain the object described above, for example, the following configuration examples are exemplified.

(Configuration 1)

Configuration 1 is directed to a computer-readable non-transitory storage medium having stored therein instructions that, when executed by a processor of an information processing apparatus for executing image processing for rendering an object placed in a virtual space, cause the processor of the information processing apparatus to manage a first texture associated with a surface of the object on the basis of a first correspondence relationship and including first color information, a second texture associated with the surface of the object on the basis of a second correspondence relationship and including second color information, and a third texture associated with the surface of the object on the basis of a third correspondence relationship and including height information; control a line-of-sight direction of a virtual camera placed in the virtual space; and determine a rendering color using at least the first color information, of the first texture corresponding to the surface of the object, obtained on the basis of the first correspondence relationship and the second color information, of the second texture corresponding to the surface of the object, obtained on the basis of a corrected correspondence relationship obtained by correcting the second correspondence relationship through correction based on the height information specified on the basis of a relationship between the line-of-sight direction of the virtual camera and orientation of the surface of the object and the third correspondence relationship, and render the surface of the object.

According to the above configuration example, in a process of determining the rendering color of each pixel, it is possible to represent an object having a sense of transparency, without performing transparency processing or the like of actually making the surface of the object transparent. Therefore, an object having a sense of transparency can be represented by processing having a lower load.

(Configuration 2)

According to Configuration 2, in Configuration 1 described above, the second color information may be obtained by shifting a position in the second texture that is referred to in the rendering, from a position specified on the basis of the second correspondence relationship to a position further shifted on the basis of the correction.

According to the above configuration example, the second correspondence relationship is corrected for each pixel. That is, rendering in which the positional relationship between the virtual camera and the object is accurately reflected for each pixel is enabled.

(Configuration 3)

According to Configuration 3, in Configuration 2 described above, a shift direction and a shift amount in and by which the position in the second texture that is referred to in the rendering is shifted may be determined on the basis of a relative relationship between the line-of-sight direction of the virtual camera and the orientation of the surface of the object.

According to the above configuration example, the shift direction and the shift amount are determined in consideration of the relationship between the orientation (line-of-sight direction) of the virtual camera and the orientation of the surface of the object. Accordingly, an image that is less uncomfortable in terms of the appearance of an object having a sense of transparency can be provided in the representation of the object.

(Configuration 4)

According to Configuration 4, in Configuration 3 described above, the shift amount may be determined such that the shift amount is decreased as the line-of-sight direction of the virtual camera is closer to a direction opposite to a normal direction of the surface of the object.

According to the above configuration example, for example, the shift amount is increased as the line-of-sight direction of the virtual camera is closer to horizontality with respect to the object (surface). Accordingly, representation of a sense of transparency based on the feeling of unevenness and height difference of the object surface can be made richer.

(Configuration 5)

According to Configuration 5, in Configuration 1 described above, the instructions may further cause the processor to:

place a virtual light source in the virtual space; and
in the rendering,
determine the rendering color by combining at least the first color information and the second color information at a predetermined ratio, and
determine the rendering color such that a proportion of the second color information is higher when the light source is located on a back side of the surface of the object than when the light source is located on a surface side of the object.

According to the above configuration example, the combination ratio between the colors related to the first color information and the second color information is determined according to the positional relationship between the light source and the virtual camera. Specifically, the colors related to the first color information and the second color information are combined such that the proportion of the color related to the second color information is higher when the positional relationship with the light source is a relationship causing backlighting than when the positional relationship with the light source is a relationship causing front lighting. Therefore, in the case of backlighting, the color related to the second color information can be represented more strongly than in the case of front lighting. A richer representation of a sense of transparency is enabled by taking such a positional relationship with the light source into consideration.

According to the present disclosure, an object having a sense of transparency can be represented by processing having a lower load.

BRIEF DESCRIPTION OF THE DRAWINGS

FIG. 17 illustrates a non-limiting screen example in the case where the processing according to the exemplary embodiment is used;

FIG. 18 illustrates a non-limiting screen example in the case where the processing according to the exemplary embodiment is used;

DETAILED DESCRIPTION OF NON-LIMITING EXAMPLE EMBODIMENTS

Hereinafter, an exemplary embodiment will be described. It is to be understood that, as used herein, elements and the like written in singular form with a word "a" or "an" attached before them do not exclude those in the plural form.

[Hardware Configuration of Information Processing Apparatus]

First, an information processing apparatus for executing information processing according to the exemplary embodiment will be described. The information processing apparatus is, for example, a smartphone, a stationary or handheld game apparatus, a tablet terminal, a mobile phone, a personal computer, a wearable terminal, or the like. In addition, the information processing according to the exemplary embodiment can also be applied to a game system that includes the above game apparatus or the like and a predetermined server. In the exemplary embodiment, a stationary game apparatus (hereinafter, referred to simply as a game apparatus) will be described as an example of the information processing apparatus.

Figure 1:
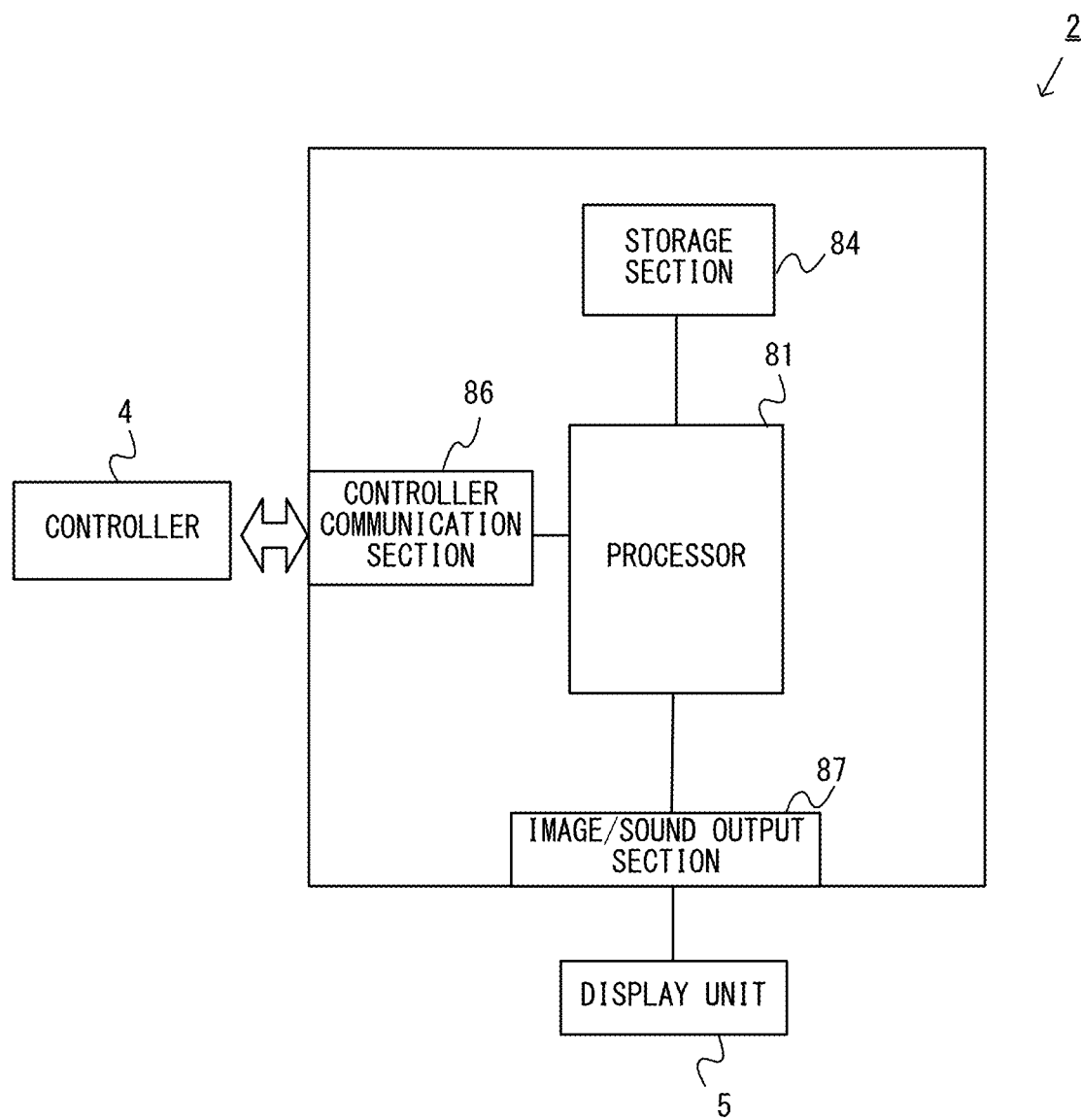
FIG. 1 is a block diagram showing a non-limiting example of the configuration of a game apparatus 2.

FIG. 1 is a block diagram showing an example of the internal configuration of a game apparatus 2 according to the exemplary embodiment. The game apparatus 2 includes a processor 81. The processor 81 is an information processing section for executing various types of information processing to be executed by the game apparatus 2. For example, the processor 81 may be composed only of a CPU (Central Processing Unit), or may be composed of a SoC (System-on-a-chip) having a plurality of functions such as a CPU function and a GPU (Graphics Processing Unit) function.

The processor 81 performs the various types of information processing by executing an information processing program stored in a storage section 84. The storage section 84 may be, for example, an internal storage medium such as a flash memory and a dynamic random access memory (DRAM), or may be configured to utilize an external storage medium mounted to a slot that is not shown, or the like.

The game apparatus 2 also includes a controller communication section 86 for the game apparatus 2 to perform wired or wireless communication with a controller 4. Although not shown, the controller 4 is provided with various buttons such as a cross key and A, B, X, and Y buttons, an analog stick, etc.

Moreover, a display unit 5 (for example, a television, or the like) is connected to the game apparatus 2 via an image/sound output section 87. The processor 81 outputs an image and sound generated (for example, by executing the above information processing) to the display unit 5 via the image/sound output section 87.

Hereinafter, an example of the processing according to the exemplary embodiment will be described. The processing according to the exemplary embodiment relates to rendering of a (three-dimensional) object. More specifically, the processing according to the exemplary embodiment relates to a rendering process for representing an object having a sense of transparency. In addition, the rendering process can be performed, for example, as part of game processing.

Generally, a technique using a texture image in order to represent the surface texture, etc., of an object (so-called texture mapping) has been known. In the exemplary embodiment, at least two textures are used to represent the sense of transparency of a certain object. A first one of the textures (hereinafter, first texture) is conceptually an image for representing the surface of the object (the foreground color thereof, so to speak). A second one of the textures (hereinafter, second texture) is conceptually an image that is assumed to be located inside the object, and is an image that is assumed to be seen due to the object surface being transparent. That is, the second texture is an image for representing what is inside the object that can be seen through (the color of the background which is seen through the object, so to speak). When rendering the object (each pixel corresponding thereto), pixels of a portion, of the first texture, where a sense of transparency is desired to be provided are rendered such that the color of the second texture is blended with the color of the portion. By adjusting the blending ratio at this time, it is possible to represent this portion of the first texture image such that the image of the second texture seems to be seen therethrough. For example, if the blending ratio of the color of the first texture is made higher, a sense of translucency can be represented such that the image of the second texture seems to be slightly seen through the first texture. In addition, if the blending ratio of the color of the second texture is made higher, the surface of the object can be represented so as to be more translucent.

Even with the above technique, it is possible to represent a sense of transparency to some extent on the surface of the object. However, in the exemplary embodiment, with the following processing, it is made possible to represent an object having a higher sense of transparency. Although described in detail later, in the exemplary embodiment, a rendering process is performed using the technique of so-called parallax mapping only for the second texture such that the second texture looks more three-dimensional. Accordingly, a higher sense of transparency can be given to the surface of the object, and the sense of depth and the sense of perspective of the interior of the object that can be seen through the exterior (desired to be shown so as to be seen through the exterior) can be represented more effectively. In addition, it is possible to represent such an object having a sense of transparency with a lower processing load than when transparency processing is used.

Figure 2:
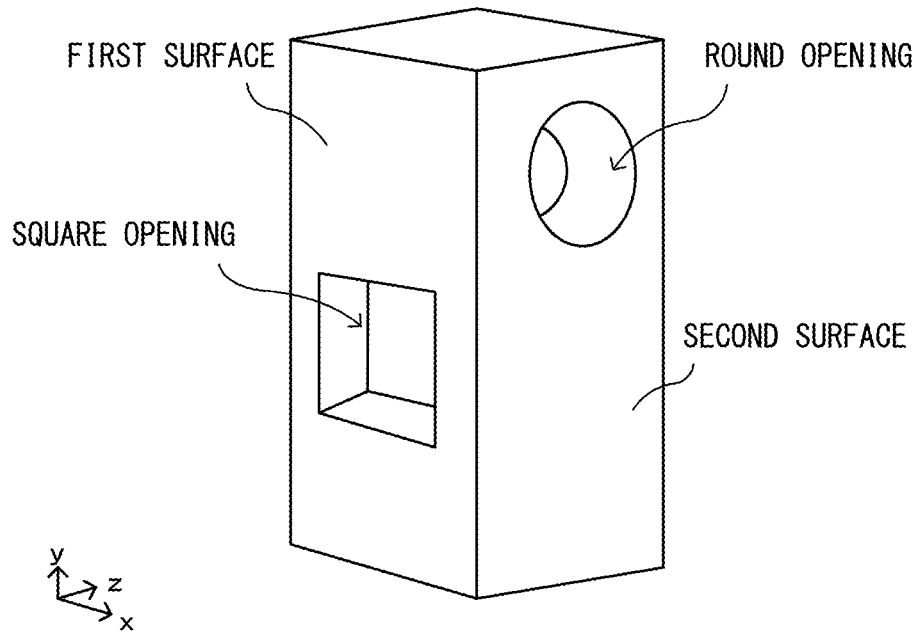
FIG. 2 is a non-limiting example diagram for describing an outline of processing according to an exemplary embodiment.
Figure 3:
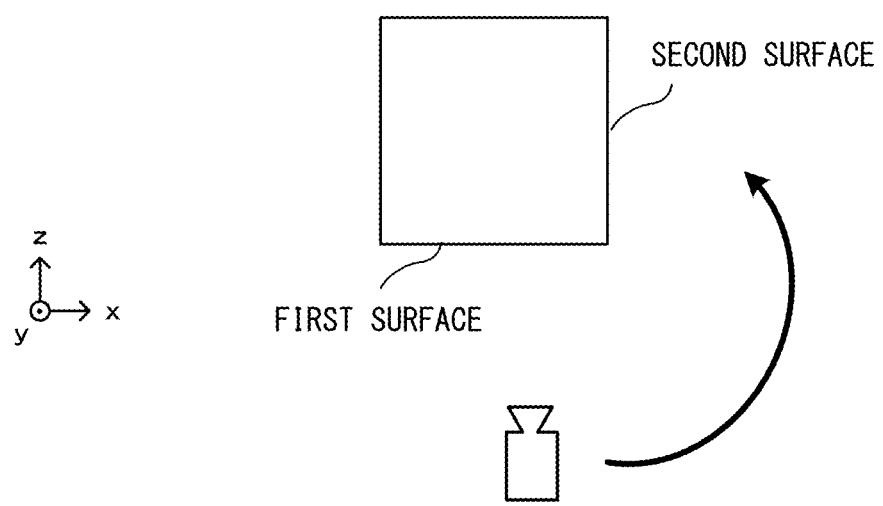
FIG. 3 is a non-limiting example diagram for describing the outline of the processing according to the exemplary embodiment.

An example of an object image in the case where the processing according to the exemplary embodiment is not used and an example of an object image in the case where the processing according to the exemplary embodiment is used, are shown in FIG. 2 to FIG. 11. Here, as an example, an example in which a columnar object that is vertically long and has a rectangular shape as shown in FIG. 2 is rendered is shown. The columnar object has a square opening in a first surface thereof, and has a round opening in a second surface thereof. In addition, as for movement of a virtual camera, the case where the virtual camera is moved so as to go around to the second surface from a state where the virtual camera takes an image from a height at which the virtual camera looks down slightly at the first surface, is assumed (see FIG. 3). In addition, in this example, representation in which inner wall portions of these openings seem to be seen through is assumed.

Figure 4:
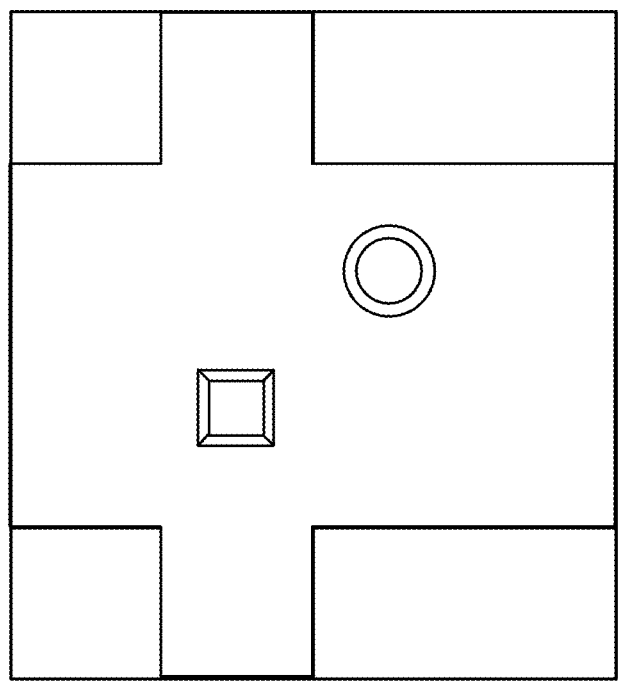
FIG. 4 is a schematic diagram showing a non-limiting example of a first texture.
Figure 5:
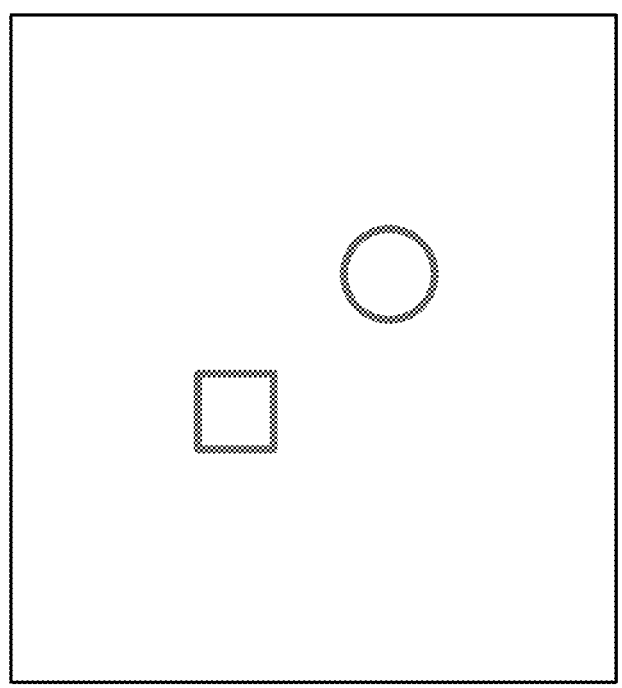
FIG. 5 is a schematic diagram showing a non-limiting example of a second texture.

Also, a texture shown in FIG. 4 is prepared as the first texture, and a texture shown in FIG. 5 is prepared as the second texture. FIG. 4 and FIG. 5 are diagrams schematically showing the textures, respectively, and it can also be said that the first texture is an image corresponding to a surface portion of the columnar object and is a basic image. In FIG. 4, the first texture is an image in which a square opening and a round opening are represented. In addition, for simplification of description, the color of the columnar object in the first texture is assumed to be a predetermined single color. That is, the first texture is assumed to be a monochromatic image.

Meanwhile, the second texture is an image assumed to be an inner wall that can be seen through the openings. In this example, the second texture is an image in which portions corresponding to the "edges" of the openings are represented using a color different from the above predetermined single color. For example, the predetermined single color of the first texture is orange, and the portions at the "edges" of the second texture are white. In addition, the color of the second texture other than the "edges" is the same color as the first texture.

Figure 6:
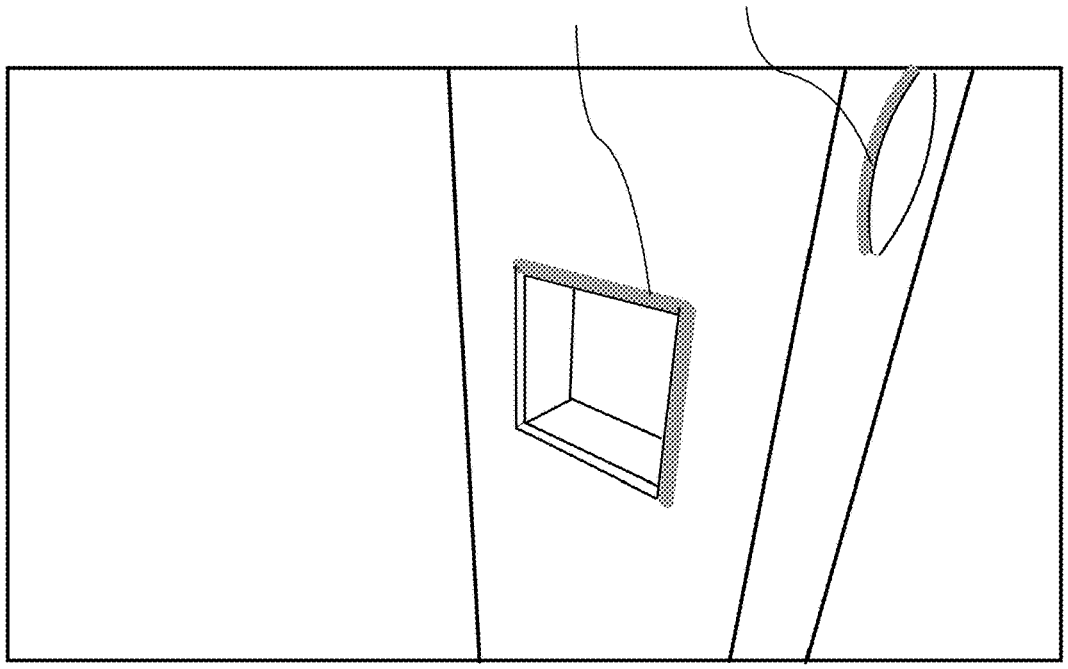
FIG. 6 illustrates a non-limiting screen example in the case where the processing according to the exemplary embodiment is not used.
Figure 7:
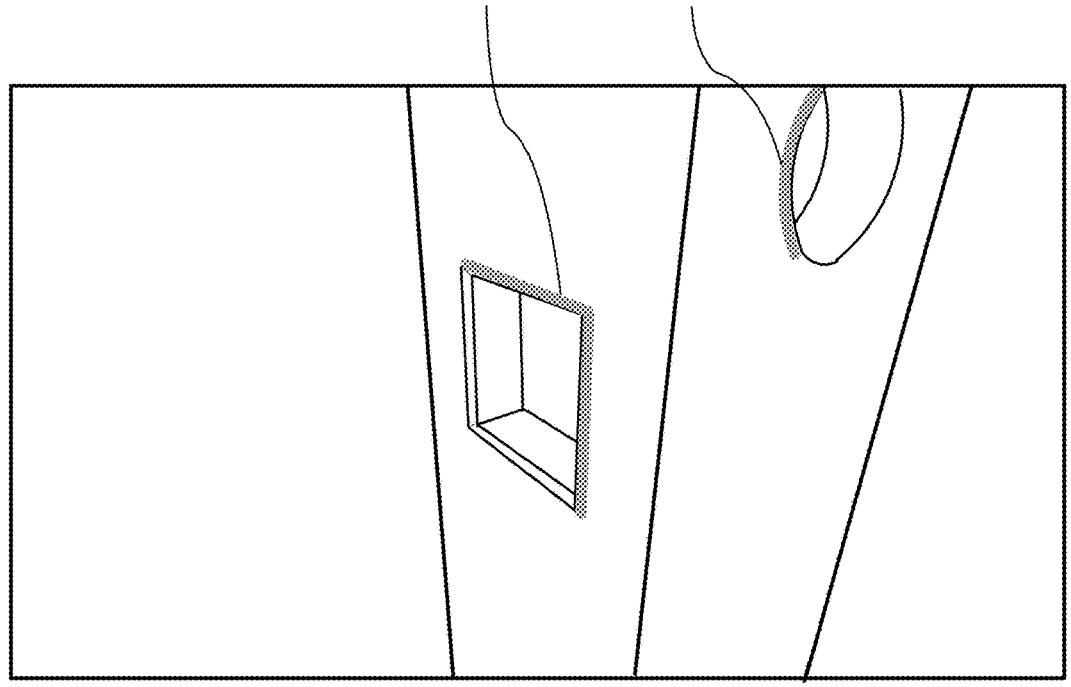
FIG. 7 illustrates a non-limiting screen example in the case where the processing according to the exemplary embodiment is not used.
Figure 8:
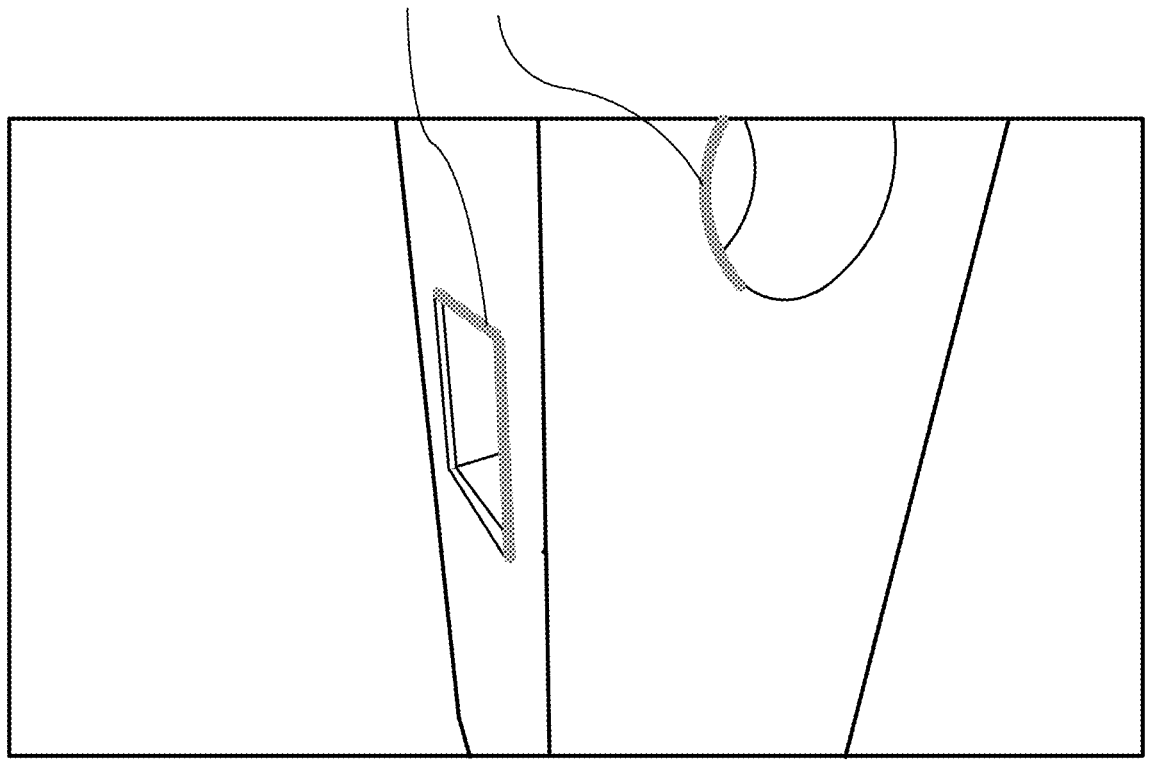
FIG. 8 illustrates a non-limiting screen example in the case where the processing according to the exemplary embodiment is not used.

An example of the case where a columnar object is rendered using the above textures without performing the processing according to the exemplary embodiment is shown. FIG. 6 to FIG. 8 each illustrate an example of a screen in such a case. In FIG. 6, the virtual camera takes an image from a height at which the virtual camera looks down slightly at the square opening from the obliquely upper right side. As for a portion (pixels) that is the "edge" of the square opening, FIG. 6 shows that a color obtained by blending the color of a texel on the second texture corresponding to this portion (hereinafter, second color) with the color of a texel on the first texture corresponding to this portion (hereinafter, first color) is used as a rendering color. Also, as for the round opening at the upper right side, FIG. 6 shows that a portion at the "edge" thereof is rendered in the rendering color obtained by blending the second color with the first color.

When the virtual camera moves around to the second surface side from the state in FIG. 6, an image is displayed as shown in FIG. 7 and FIG. 8. In each of FIG. 7 and FIG. 8, the portion that is the "edge" of each opening is rendered in the rendering color obtained by blending the second color with the first color. Therefore, FIG. 7 and FIG. 8 each show that the portion at the "edge" of each opening is represented such that the portion looks slightly transparent.

Figure 9:
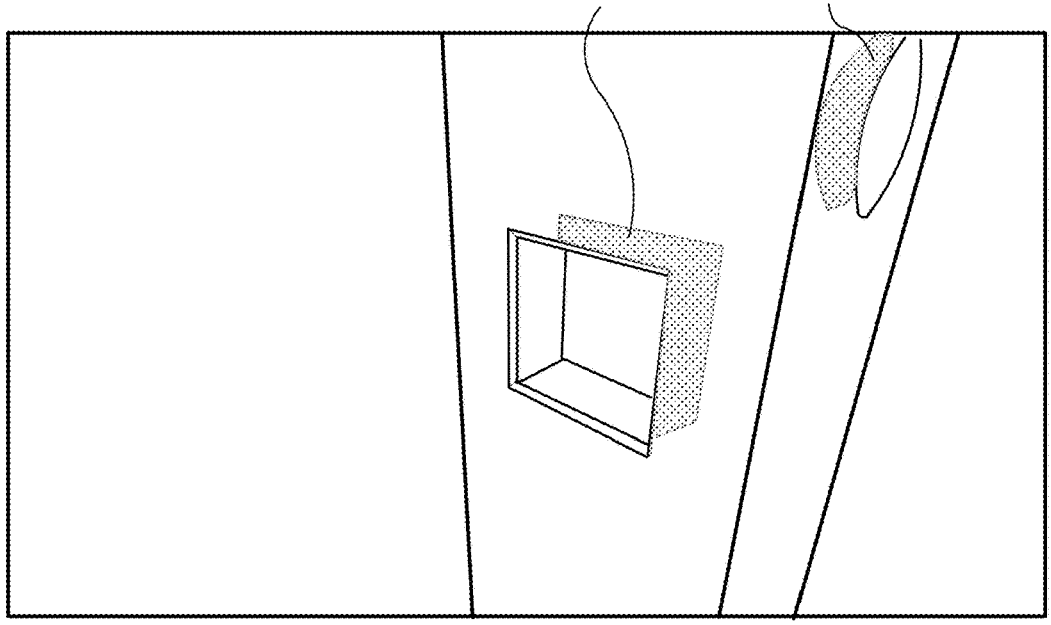
FIG. 9 illustrates a non-limiting screen example in the case where the processing according to the exemplary embodiment is used.
Figure 10:
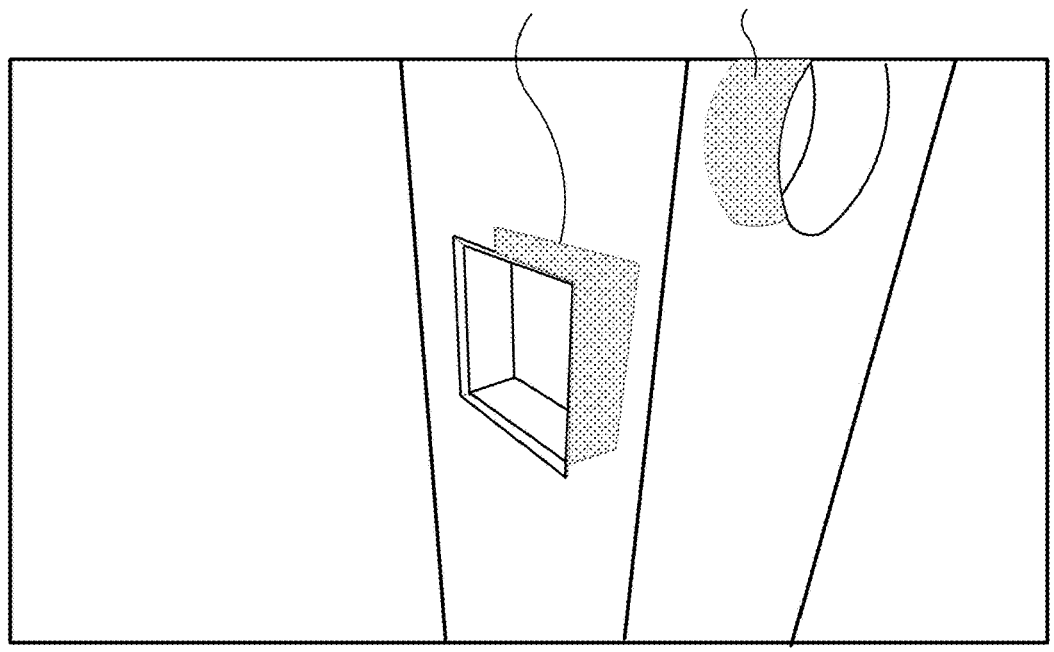
FIG. 10 illustrates a non-limiting screen example in the case where the processing according to the exemplary embodiment is used.
Figure 11:
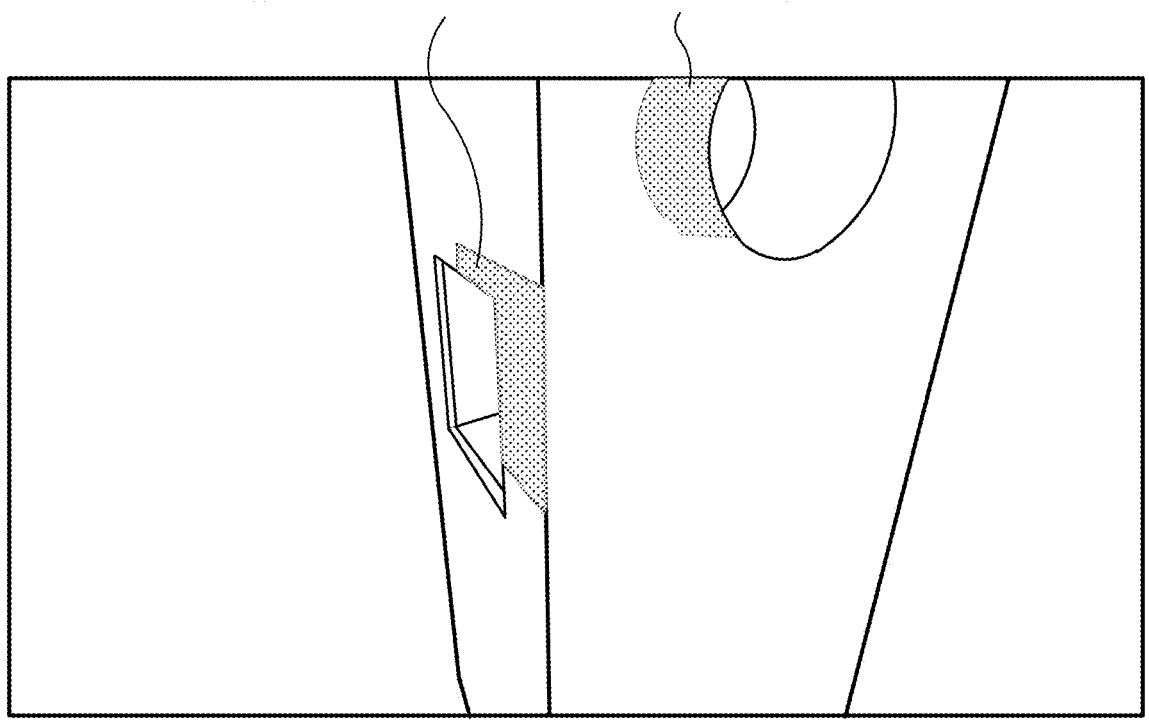
FIG. 11 illustrates a non-limiting screen example in the case where the processing according to the exemplary embodiment is used.

Next, a screen example of a columnar object in the case where the processing according to the exemplary embodiment is applied is shown in FIG. 9 to FIG. 11. In FIG. 9 to FIG. 11, portions shown by shading patterns indicate portions (pixels) that are rendered such that the second color of the above portions at the "edges" in the second texture is blended. In the case where the processing according to the exemplary embodiment is applied, as for the area around the "edge" of each opening, the portion that is rendered such that the second color of the above portion at the "edge" is blended has a wider range than in the case of FIG. 6 to FIG. 8 described above. In addition, FIG. 9 to FIG. 11 show that the size and the range of the portion that is rendered such that the second color of the portion at the "edge" is blended also change according to change of the position (imaging direction and height) of the virtual camera. By performing such rendering, the way in which the inner wall portion (portion having a different rendering color) of the opening that can be seen through the exterior is shown can be changed according to change of the viewpoint. Accordingly, the portion that can be seen through the exterior (desired to be shown so as to be seen through the exterior) can be represented so as to have a higher sense of perspective and a higher sense of depth, so that it is possible to provide an image that gives a higher sense of transparency. In this example, the area around each opening is represented so as to give a higher sense of transparency than in the above case. The processing related to this representation does not actually make the object transparent, but is processing for making the object look as if the object was transparent. That is, since so-called transparency processing or the like is not performed, it is not necessary to control the rendering order of the object, etc., and the processing load is low. The processing according to the exemplary embodiment is processing in a so-called fragment shader (pixel shader).

Next, the principle and outline of the object rendering process according to the exemplary embodiment will be described. In the exemplary embodiment, three textures including the two textures described above as well as a third texture used in the above parallax mapping technique are used. Hereinafter, each texture will be described.

First, the first texture is conceptually a texture that corresponds to the "surface of the object". In the exemplary embodiment, the first texture is, for example, a so-called albedo image (an image unaffected by a light source, also called an albedo map or the like).

The second texture is an image of what is desired to be shown to "seem to be seen through the exterior" as described above. In the exemplary embodiment, a description will be given with a normal RGB image as an example, but in another exemplary embodiment, color brightness and color depth may be specified using RGB values. In this case, when viewed in an RGB image, the image is, for example, a grayscale image.

The third texture is a texture that is used when the above parallax mapping technique is used, and, specifically, is called "height map" which is also used in bump mapping. The height map is image data in which information (height data) indicating the height (unevenness) of an object surface is stored in an RGB format. For example, the height map is image data in which data indicated by values in the range of 0 to 1 with the highest height being set to 1 (white) and with the lowest height being set to 0 (black) is stored (for example, the image is a grayscale image).

Figure 12:
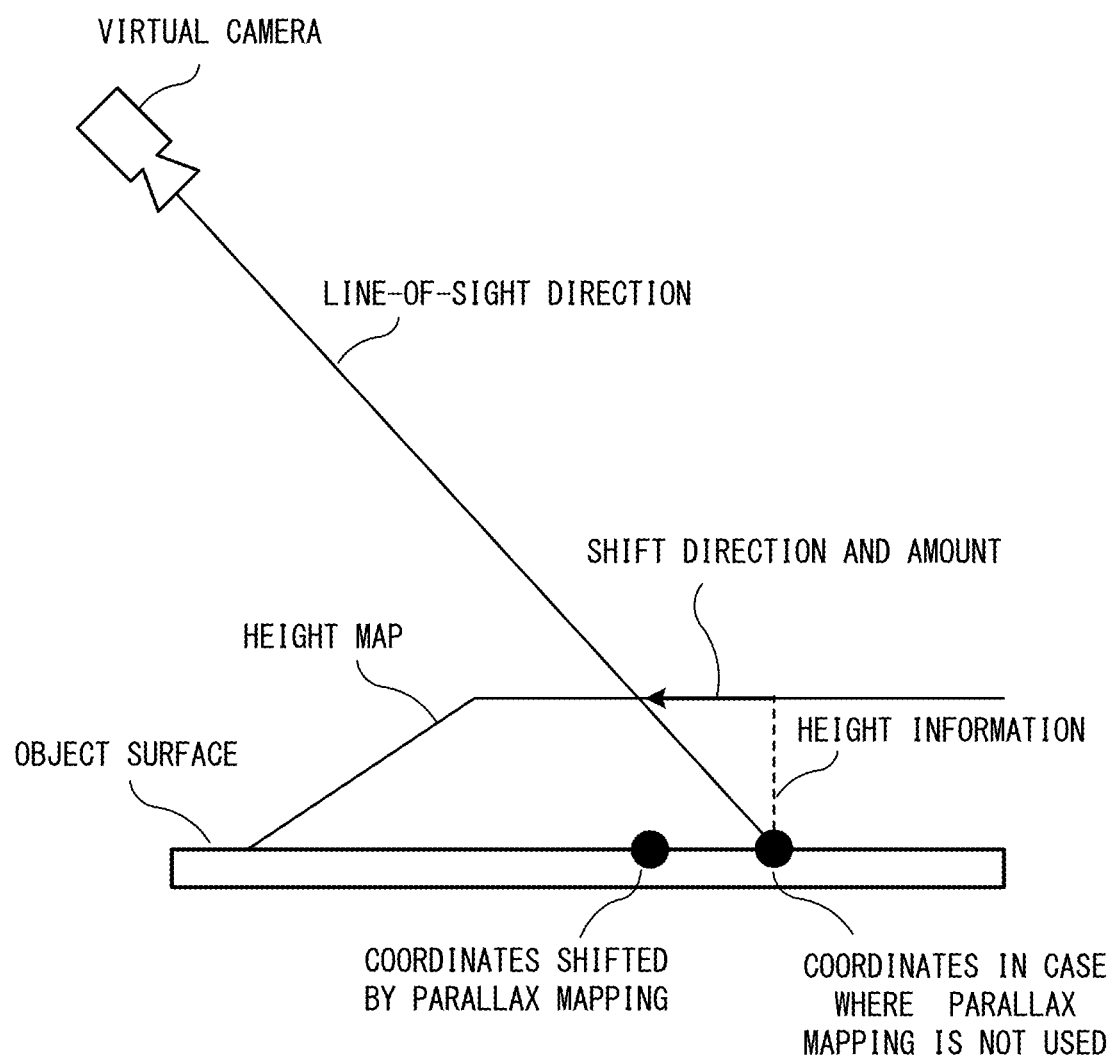
FIG. 12 is a non-limiting example diagram for describing parallax mapping.

Here, as for the parallax mapping technique, since the parallax mapping technique itself is a well-known technique, the detailed description thereof is omitted, but the point related to the processing of the exemplary embodiment will be briefly described. First, the parallax mapping is a writing technique that represents the sense of perspective of irregularities and height difference of an object surface by combining height information corresponding to each pixel with a texture having no irregularities. Also, the above height map is information that specifies the height of the object surface. The parallax mapping is a technique that shifts texture coordinates that are referred to when rending the object, in consideration of the height. Accordingly, shading that takes the height into consideration can be performed. The parallax is determined on the basis of the angle difference between the line-of-sight direction of the virtual camera and the direction (normal line) of the surface of the object (polygon). The direction (hereinafter, shift direction) and the amount (hereinafter, shift amount) in and by which the above coordinates are shifted change depending on the positional relationship (parallax) between the virtual camera and the object surface. For example, the closer the line-of-sight direction of the virtual camera is to horizontality with respect to the surface of the object (polygon), the larger the shift amount is. Conversely, the closer the line-of-sight direction of the virtual camera is to a direction along the frontal direction of the surface of the object, the smaller the shift amount is (the shift amount is 0 when an image is taken directly from the front of the object). Also, the shift direction is determined on the basis of whether the virtual camera has moved up, down, left, or right with respect to a position in the case where an image of the object is taken from the front of the object. For example, if the virtual camera has moved to the right, the shift direction is determined as the leftward direction. That is, the parallax mapping technique is a technique that shifts the texture coordinates that are referred to, in consideration of the orientation of the virtual camera and the height indicated by the above height map. For example, as shown in FIG. 12, there are object coordinates that are the gazing point of the virtual camera when the height is not taken into consideration, and a shift of the position of the gazing point is obtained on the basis of the above parallax and height information (height map) regarding the coordinates. Then, texture coordinates corresponding to coordinates reflecting this shift are referred to.

In the exemplary embodiment, an object is rendered with the following processing, applying the above parallax mapping technique. First, prior to the object rendering process, correspondence information indicating which part on a texture is used by each part of the surface (mesh) of the object, that is, texture coordinates corresponding to the object surface, is specified in advance. That is, a first correspondence relationship indicating first texture coordinates corresponding to each part of the surface of the object, a second correspondence relationship indicating second texture coordinates corresponding to each part of the surface of the object, and a third correspondence relationship indicating third texture coordinates corresponding to each part of the surface of the object, are set. Hereinafter, these correspondences are collectively referred to as "basic correspondence definition"

Next, the color to be used for rendering each pixel is obtained from each texture, and, as the first color, the color at the texture coordinates of the first texture (hereinafter, first texture coordinates) corresponding to each pixel to be rendered (rendering target pixel) is obtained according to the basic correspondence definition.

Figure 13:
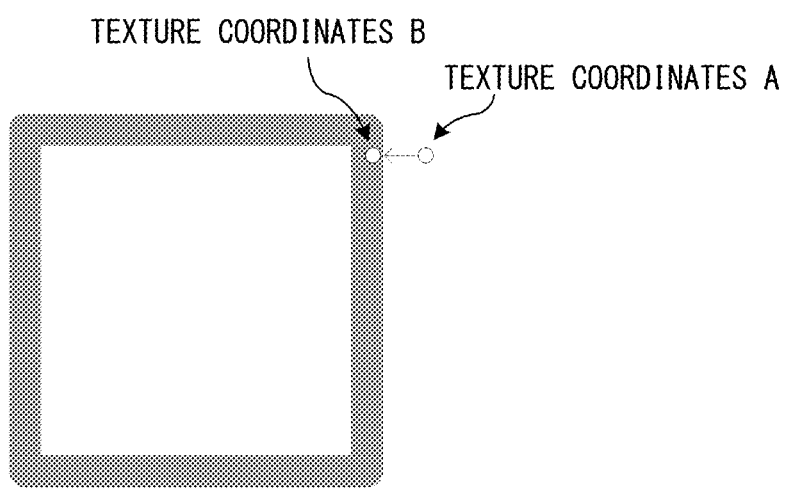
FIG. 13 is a non-limiting example diagram for describing the outline of the processing according to the exemplary embodiment.

Meanwhile, for the second color, the texture coordinates of the second texture (hereinafter, second texture coordinates) determined according to the basic correspondence definition are not used as they are, and a color obtained from coordinates (hereinafter, shift coordinates) obtained by shifting the second texture coordinates using the above parallax mapping technique is used as the second color. In other words, in the exemplary embodiment, for the second color, the second texture coordinates for obtaining the second color (to be referred to) are determined after the second correspondence relationship is corrected using the parallax mapping technique. For example, as for the second texture coordinates, the case where texture coordinates A shown in FIG. 13 are the second texture coordinates based on the basic correspondence definition is assumed. In this case, the coordinates can be shifted to texture coordinates B by the parallax mapping technique, and the color at the texture coordinates B can be determined as the second color. As a result, an image is represented such that, as shown in FIG. 9 to FIG. 11 described above, the color of the portion at the "edge" of each opening is blended with the first color, and the portions rendered in the color after the blending (shaded portions in FIG. 9 to FIG. 11) change according to the orientation and the height of the virtual camera. For example, in the example in the above drawings, an image in which the portion at each "edge" (color thereof) looks stretched can be obtained. In addition, representation in which the amount of this stretching changes according to change of the position of the virtual camera is performed.

Furthermore, in the exemplary embodiment, a process that takes the positions of the virtual camera, the object, and a light source into consideration is also performed when blending the first color and the second color. Specifically, the blending ratio between the first color and the second color is changed when the light source is located on the viewpoint side with respect to the object as viewed from the virtual camera (the case of front lighting) and when the light source is located on the depth side in the line-of-sight direction with respect to the object as viewed from the virtual camera (the case of backlighting). In the exemplary embodiment, in the case of front lighting, the first color and the second color are blended such that the proportion of the first color is higher than that of the second color. In the case of backlighting, the first color and the second color are blended such that the proportion of the second color is higher than that of the first color. Accordingly, in the case of front lighting, representation can be performed as if light was reflected on the surface of the object. In addition, in the case of backlighting, representation can be performed as if light passed through the surface of the object to more illuminate the interior of the object, so that the object can be represented with a higher sense of transparency.

Figure 14:
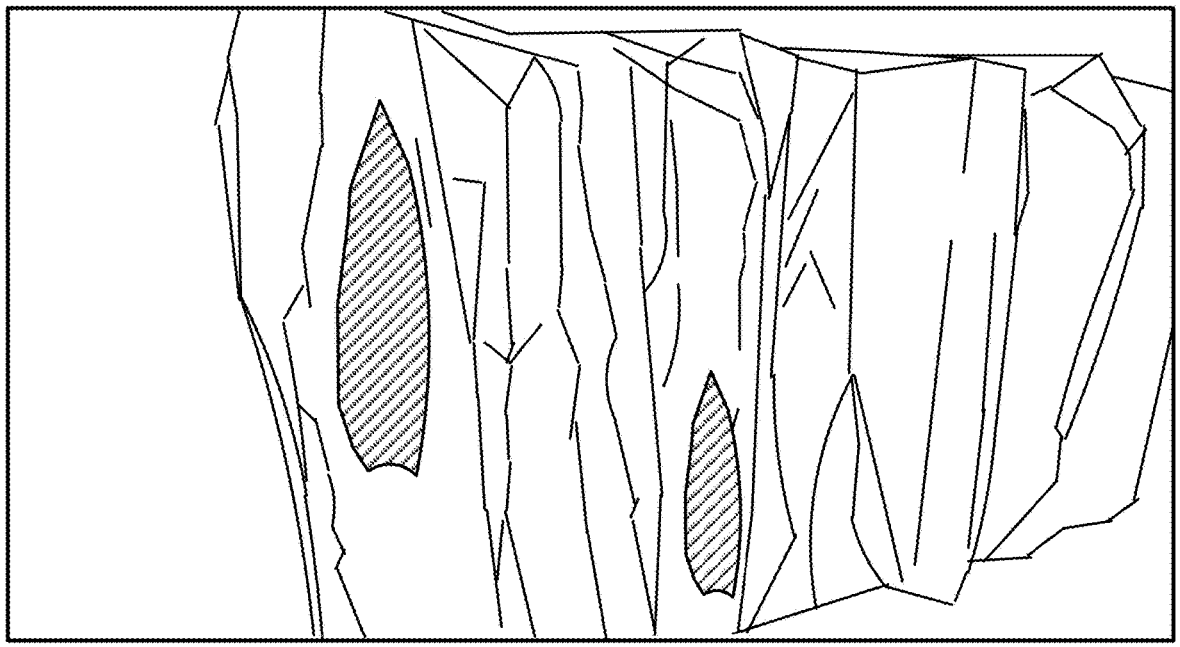
FIG. 14 illustrates a non-limiting screen example in the case where the processing according to the exemplary embodiment is not used.
Figure 15:
FIG. 15 illustrates a non-limiting screen example in the case where the processing according to the exemplary embodiment is not used.
Figure 16:
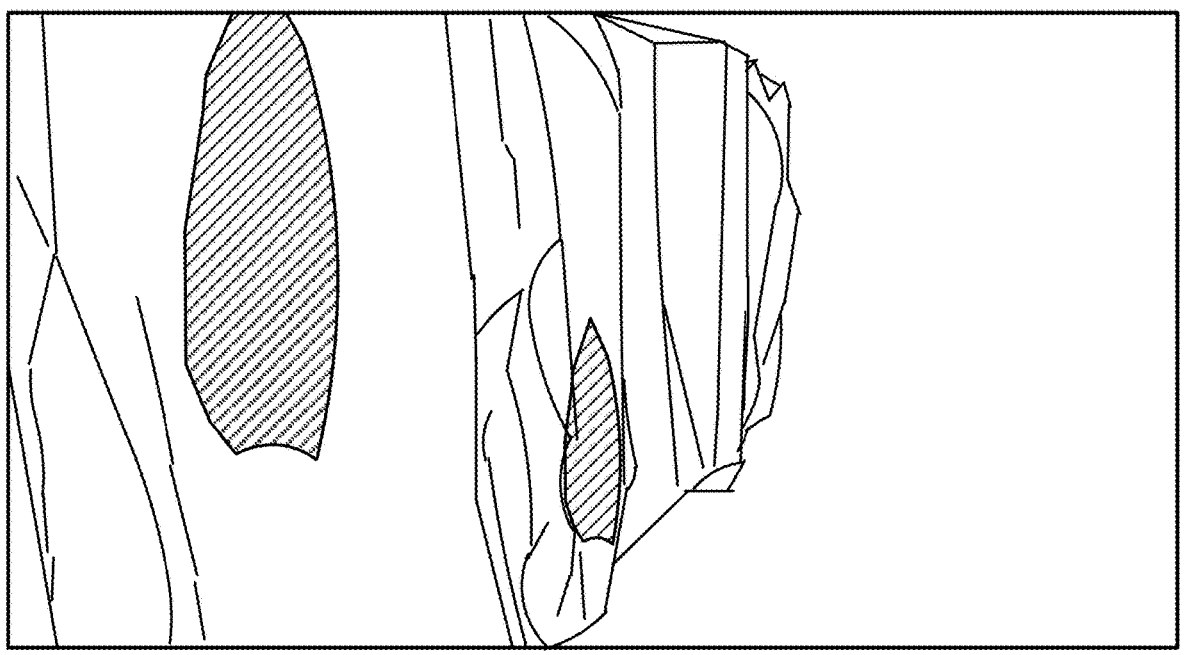
FIG. 16 illustrates a non-limiting screen example in the case where the processing according to the exemplary embodiment is not used.
Figure 19:
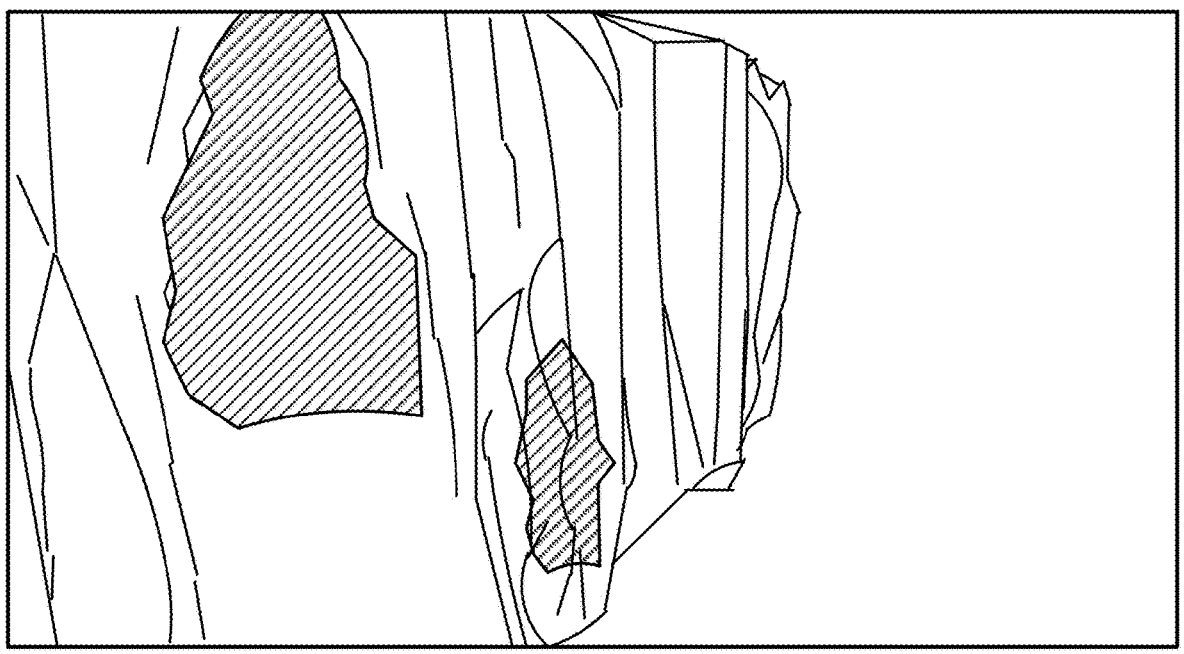
FIG. 19 illustrates a non-limiting screen example in the case where the processing according to the exemplary embodiment is used.

In the above description, the columnar object having openings is used as an example, but, the above processing is also useful, for example, for the case where the sense of transparency of an object such as "ice" having a sense of transparency in the real world is desired to be represented. FIG. 14 to FIG. 16 each show an example in the case where an ice block object is rendered without using the above-described processing. Also, FIG. 17 to FIG. 19 each show an example in which an ice block object is rendered by applying the above-described processing. As the movement of the virtual camera assumed in the changes in these drawings, the virtual camera moves slightly closer to the ice block object while moving around from right to left. As for textures used for the ice block object, the first texture is, for example, an image created mainly in bright blue, and is an image that represents the surface of an ice block. In addition, the second texture is an image created mainly in dark blue or purple, and is an image that represents the interior of the ice block that can be seen through the exterior. In FIG. 14 to FIG. 19, portions related to the second texture are shown by shading patterns.

In FIG. 14 to FIG. 16, an image is displayed such that the portions related to the second texture are enlarged as the virtual camera approaches the portions, but representation is performed such that the shapes of the portions do not change significantly. On the other hand, in FIG. 17 to FIG. 19, as for each of the portions, the shape itself (especially the width) thereof changes more significantly than in FIG. 14 to FIG. 16 described above as the virtual camera moves. In other words, the image of the ice interior (second texture) is represented such that the ice interior moves so as to shift with respect to the ice surface (first texture) without synchronizing the change in representation (movement) of the ice surface (first texture) due to the movement of the virtual camera. Therefore, each of the portions related to the second texture where the surface of the ice is transparent (is made to look transparent) can be represented such that the shape (display range), etc., of the portion change in response to the movement of the virtual camera. Accordingly, representation that gives a higher sense of perspective of the ice (interior) can be performed, and richer representation of the sense of transparency is enabled.

Meanwhile, as for the above columnar object, if the case where there are no irregularities on the surface portion other than the openings is assumed, a value indicating the same height is uniformly set in the above height map. As a result, the shift amount becomes uniform. On the other hand, if the object is assumed to have irregularities on the surface, the shift amount can vary depending on the pixel. For example, in the example of the above ice block object, it is assumed that there are irregularities on the surface of the ice. In this case, a height map corresponding to the irregularities on the surface of the ice is prepared. That is, the unevenness of the surface of the ice is taken into consideration (reflected) in the second texture coordinates (shift coordinates) obtained for the second color. Therefore, the shift amount does not become uniform and can vary from pixel to pixel. As a result, in FIG. 17 to FIG. 19 described above, the peripheries of the shaded portions are represented such that steps are formed according to the irregularities (height) of the surface of the ice block object.

As described above, in the exemplary embodiment, the color of the second texture is blended with the color of the first texture, and an object having a sense of transparency is represented. At this time, the parallax mapping technique is applied to only the second texture to shift the texture coordinates that are referred to for the second color, and then a rendering color is determined. Accordingly, the image corresponding to the interior of the object can be shown such that the view of the image changes three-dimensionally in response to the movement of the virtual camera. As a result, the sense of perspective of the interior of the object that is seen through the exterior (made to seem to be seen through the exterior) can be represented, so that an object having a higher sense of transparency can be represented with a lower processing load.

[Details of Processing of Exemplary Embodiment]

Figure 20:
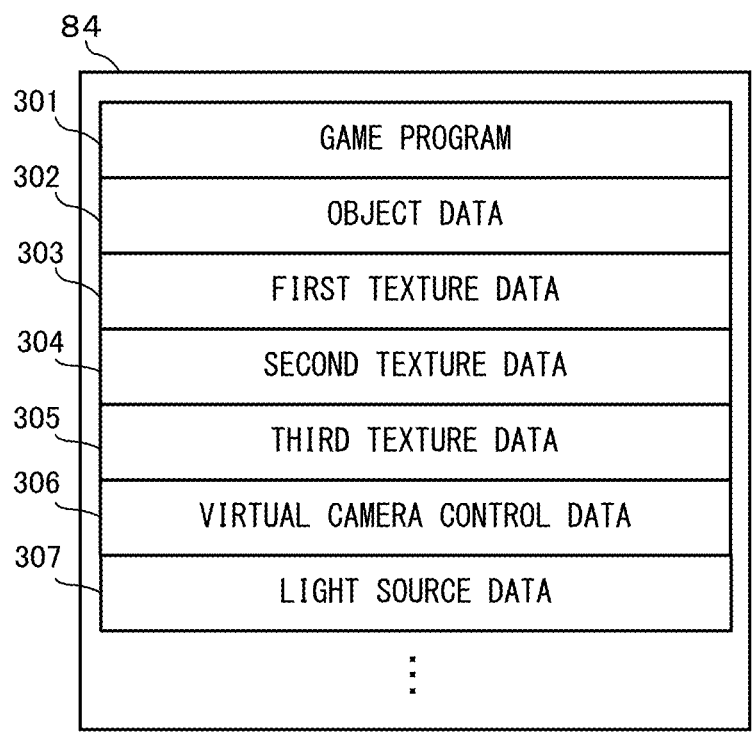
FIG. 20 illustrates a non-limiting example of a program and data stored in a storage section 84 of the game apparatus 2.

Next, the processing of the exemplary embodiment will be described in more detail with reference to FIG. 20 to FIG. 22. This processing is assumed to be executed, for example, as part of game processing, but in the following, only processing related to rendering of an object as described above will be described, and the description of the other game processing is omitted.

[Data to be Used]

First, various kinds of data to be used in the processing according to the exemplary embodiment will be described. FIG. 20 shows an example of a program and data stored in the storage section 84 of the game apparatus 2. In the storage section 84, a game program 301, object data 302, first texture data 303, second texture data 304, third texture data 305, virtual camera control data 306, light source data 307, etc., are stored.

The game program 301 is a program for executing a game including the object rendering process according to the exemplary embodiment.

The object data 302 is data regarding objects to be rendered. Specifically, the object data 302 includes polygon data of each object. In addition, the object data 302 also includes position information indicating the position at which the object is placed in a virtual space, and orientation information of the object.

The first texture data 303, the second texture data 304, and the third texture data 305 are image data of a first texture, a second texture, and a third texture, respectively. These texture data are prepared for each of the objects.

The virtual camera control data 306 is data for controlling the movement, etc., of the virtual camera in the virtual space. The virtual camera control data 306 includes information indicating the position, the line-of-sight direction (imaging direction), the angle of view, etc., of the virtual camera.

The light source data 307 is data that defines the position of the light source in the virtual space and the intensity of the light of the light source.

In addition, various kinds of data required for the object rendering process are stored as necessary in the storage section 84.

[Details of Rendering Process]

Next, the details of the processing according to the exemplary embodiment will be described. In the exemplary embodiment, flowcharts described below are realized by one or more processors reading and executing the above program stored in one or more memories. The flowcharts are merely an example of the processing. Therefore, the order of each process step may be changed as long as the same result is obtained. In addition, the values of variables and thresholds used in determination steps are also merely examples, and other values may be used as necessary.

Figure 21:
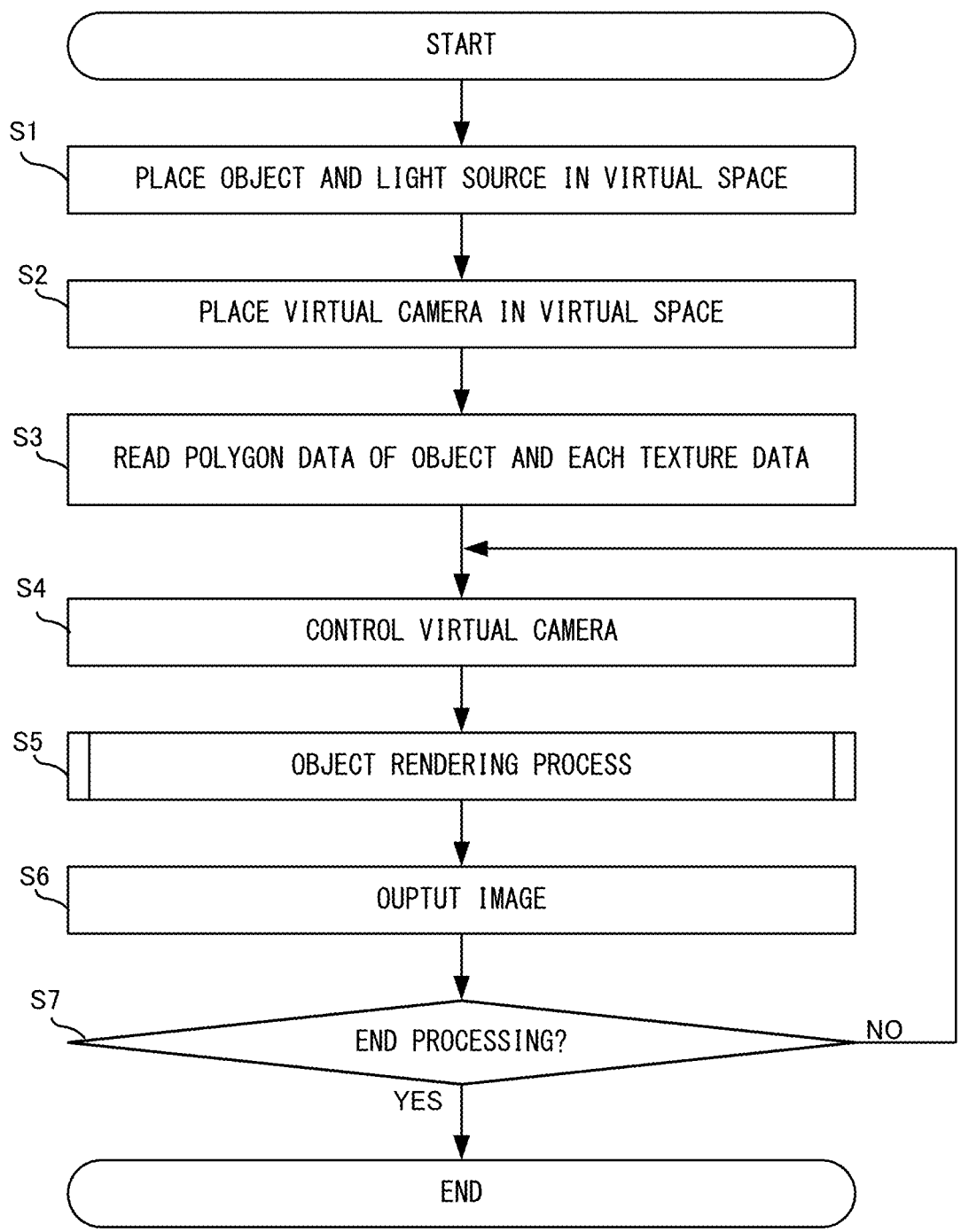
FIG. 21 is a non-limiting example flowchart showing the details of the processing according to the exemplary embodiment.
Figure 22:
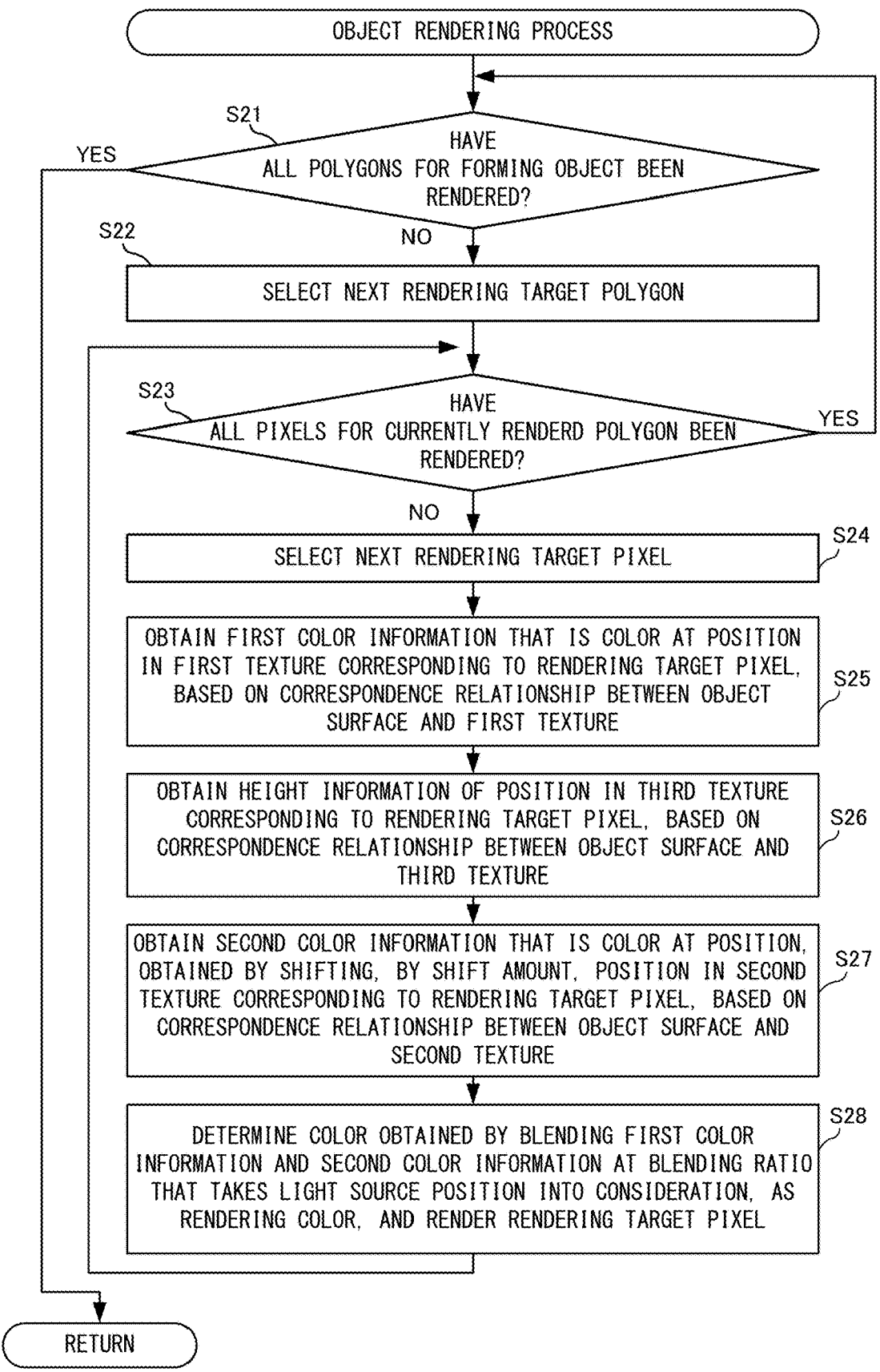
FIG. 22 is a non-limiting example flowchart showing the details of an object rendering process.

FIG. 21 is a flowchart showing the details of the processing according to the exemplary embodiment. A process loop of steps S4 to S7 in FIG. 21 is repeatedly executed every frame period.

In FIG. 21, first, in step S1, the processor 81 places an object to be rendered, in the virtual space. In addition, the processor 81 also places the light source in the virtual space. Furthermore, in step S2, the processor 81 places the virtual camera in the virtual space.

Next, in step S3, the processor 81 reads the polygon data from the object data 302. Furthermore, the processor 81 reads the first texture data 303, the second texture data 304, and the third texture data 305 associated with the object. In addition, at this time, the above-described basic correspondence definition is set. That is, a correspondence relationship between the surface of the object and the texture coordinates of each texture described above is set.

Next, in step S4, the processor 81 controls the virtual camera. That is, movement and the line-of-sight direction (imaging direction) of the virtual camera are set. This control may be control in which the virtual camera is moved on the basis of an operation by a user on the controller 4, or may be control in which the virtual camera is moved automatically without any operation by the user.

Next, in step S5, the processor 81 executes an object rendering process. FIG. 22 is a flowchart showing the details of the object rendering process. In FIG. 22, first, in step S21, the processor 81 determines whether or not all polygons for forming the object to be rendered have been rendered. If not all the polygons have been rendered (NO in step S21), in step S22, the processor 81 selects a rendering target polygon to be rendered next, from among the polygons that have not been rendered yet.

Next, in step S23, the processor 81 determines whether or not all pixels corresponding to the current rendering target polygon have been rendered. As a result of the determination, if all the pixels corresponding to the current rendering target polygon have been rendered (YES in step S23), the processor 81 returns to step S21 above, and repeats the processing. On the other hand, if not all the pixels have been rendered yet (NO in step S23), in step S24, the processor 81 selects a rendering target pixel to be rendered next, from the pixels that have not been rendered yet.

Next, in step S25, the processor 81 obtains first color information indicating the color at the first texture coordinates corresponding to the rendering target pixel on the basis of the correspondence relationship, between the object surface and the first texture, based on the basic correspondence definition.

Next, in step S26, the processor 81 obtains height information of the third texture coordinates corresponding to the rendering target pixel on the basis of the correspondence relationship, between the object surface and the third texture (height map), based on the basic correspondence definition.

Next, in step S27, the processor 81 obtains second color information which is the information of the second color, from the second texture using the above parallax mapping technique. Specifically, the processor 81 specifies the second texture coordinates corresponding to the rendering target pixel on the basis of the correspondence relationship, between the object surface and the second texture, based on the basic correspondence definition. Furthermore, the processor 81 calculates the above shift amount on the basis of the height information and the position and the orientation of the virtual camera. The shift amount is calculated using the following mathematical expression.

Second texture coordinates−(XY components of vector in line-of-sight direction×height×predetermined coefficient)  Expression 1

Then, the processor 81 acquires color information related to the second texture coordinates shifted by the calculated shift amount, as second color information.

Next, in step S28, the processor 81 blends the second color with the first color and determines the rendering color of the current rendering target pixel. At this time, the processor 81 determines the ratio of blending of the first color and the second color in consideration of the positional relationship between the rendering target object and the light source on the basis of the light source data 307. In the exemplary embodiment, this ratio is calculated as a blending ratio. As described above, if the positional relationship is a relationship causing front lighting, the blending ratio is calculated such that the proportion of the first color is higher than that of the second color. If the positional relationship is a relationship causing backlighting, the blending ratio is calculated such that the proportion of the second color is higher than that of the first color. Then, the processor 81 determines the rendering color by blending the first color and the second color on the basis of the calculated blending ratio. Then, the processor 81 renders the current rendering target pixel with the determined rendering color (e.g., writing to a frame buffer is performed). Thereafter, the processor 81 returns to step S23 above, and repeats the processing.

On the other hand, as a result of the determination in step S21 above, if all the polygons for forming the rendering target object have been rendered (YES in step S21), the object rendering process is ended.

Referring back to FIG. 21, subsequent to the object rendering process, in step S6, the processor 81 outputs an image in which the above processing is reflected, to the display unit 5.

Next, in step S7, the processor 81 determines whether or not a condition for ending the processing according to the exemplary embodiment has been satisfied. If the condition has not been satisfied (NO in step S7), the processor 81 returns to step S4 above, and repeats the processing. If the condition has been satisfied (YES in step S7), the processor 81 ends the processing according to the exemplary embodiment.

This is the end of the detailed description of the processing according to the exemplary embodiment.

As described above, in the exemplary embodiment, when blending the colors of the first texture and the second texture and rendering an object, the parallax mapping technique is applied to only the second texture to shift the coordinates of the texture from which the second color is obtained. Therefore, for the image portions related to the second texture, an image for which the irregularities of the object surface and the positional relationship between the object surface and the virtual camera are taken into consideration and which has a higher sense of perspective and a higher sense of depth can be represented. Accordingly, an object having a sense of transparency such that the interior thereof seems to be seen through the exterior can be presented, and representation in which the sense of perspective and the sense of depth of the interior of the object are emphasized more can be performed. Furthermore, since such processing is performed at the stage of the so-called fragment/pixel shader, the processing load is relatively low. Therefore, for example, an object having a sense of transparency can be represented with a lower processing load than in the case of representing such an object by conventional transparency processing using, for example, an alpha blending method or the like.

Modifications

In the above embodiment, the example in which an image assumed to be present inside an object (image desired to be shown to seem to be seen through the exterior of the object) is used as a normal RGB image, has been described for the second texture. In addition, as mentioned above, for example, an image obtained by converting information indicating color brightness and color depth into an RGB format may be used as the second texture. In this case, the second texture can be said to conceptually define an amount of light allowed to pass through (transparency degree of) the object surface corresponding to each pixel (however, as in the above processing, processing of actually making the object surface transparent is not performed). In the case of using such a second texture, for example, "brightness information" of the second color may be obtained from the second texture coordinates (shift coordinates) determined using the above parallax mapping technique. Then, the second color may be determined by multiplying a predetermined color to be represented by the "brightness information". Alternatively, the number of colors to be multiplied may be two or more.

For the first texture, processing may be performed using a normal line map, a roughness map, or the like in combination with the above albedo map. Accordingly, an object having a sense of transparency can be represented while a more diverse representation of the surface of the object is performed.

In the above example, as for the blending of the first color and the second color, the example of calculating the blending ratio is exemplified, but instead of the blending ratio, another parameter may be used as long as the proportions of both colors can be specified by the parameter.

In the above embodiment, the height information is used as a height map (third texture). In another exemplary embodiment, for example, the height information may be configured such that the height information is embedded in alpha values in image data of an RGB alpha format and combined into a single first texture. In this case, the number of textures used can be reduced to two.

In the above embodiment, the case where the above series of processes is performed in a single apparatus has been described. However, in another embodiment, the above series of processes may be performed in an information processing system that includes a plurality of information processing apparatuses. For example, in an information processing system that includes a terminal side apparatus and a server side apparatus capable of communicating with the terminal side apparatus via a network, a part of the series of processes may be performed by the server side apparatus. Alternatively, in an information processing system that includes a terminal side apparatus and a server side apparatus capable of communicating with the terminal side apparatus via a network, a main process of the series of the processes may be performed by the server side apparatus, and a part of the series of the processes may be performed by the terminal side apparatus. Still alternatively, in the information processing system, a server side system may include a plurality of information processing apparatuses, and a process to be performed in the server side system may be divided and performed by the plurality of information processing apparatuses.

In addition, a so-called cloud gaming configuration may be adopted. For example, the game apparatus 2 may be configured to send operation data indicating a user's operation to a predetermined server, and the server may be configured to execute various kinds of game processing and stream the execution results as video/audio to the game apparatus 2.

While the present disclosure has been described in detail, the foregoing description is in all aspects illustrative and not restrictive. It is to be understood that numerous other modifications and variations can be devised without departing from the scope of the present disclosure.

What is claimed is:

1. A computer-readable non-transitory storage medium having stored therein instructions that, when executed by a processor of an information processing apparatus for executing image processing for rendering an object placed in a virtual space, cause the processor of the information processing apparatus to perform operations comprising:
    managing a first texture associated with a surface of the object on the basis of a first correspondence relationship and including first color information, a second texture associated with the surface of the object on the basis of a second correspondence relationship and including second color information, and a third texture associated with the surface of the object on the basis of a third correspondence relationship and including height information;

controlling a line-of-sight direction of a virtual camera placed in the virtual space;

determining a rendering color by blending (a) the first color information, of the first texture corresponding to the surface of the object, obtained on the basis of the first correspondence relationship and (b) the second color information, of the second texture corresponding to the surface of the object, obtained on the basis of a corrected correspondence relationship obtained by correcting the second correspondence relationship through correction based on the height information specified on the basis of a relationship between the line-of-sight direction of the virtual camera and orientation of the surface of the object and the third correspondence relationship; and rendering the surface of the object.

2. The storage medium according to claim 1, wherein the second color information is obtained by shifting a position in the second texture that is referred to in the rendering, from a position specified on the basis of the second correspondence relationship to a position further shifted on the basis of the correction.

3. The storage medium according to claim 2, wherein a shift direction and a shift amount in and by which the position in the second texture that is referred to in the rendering is shifted are determined on the basis of a relative relationship between the line-of-sight direction of the virtual camera and the orientation of the surface of the object.

4. The storage medium according to claim 3, wherein the shift amount is determined such that the shift amount is decreased as the line-of-sight direction of the virtual camera is closer to a direction opposite to a normal direction of the surface of the object.

5. The storage medium according to claim 1, wherein the instructions further cause the processor to:

place a virtual light source in the virtual space; and
in the rendering,
determine the rendering color by combining at least the first color information and the second color information at a predetermined ratio, and
determine the rendering color such that a proportion of the second color information is higher when the light source is located on a back side of the surface of the object than when the light source is located on a surface side of the object.

6. An image processing apparatus for rendering an object placed in a virtual space, the image processing apparatus comprising:

at least one processor, the processor being configured to control the information processing apparatus to at least:
manage a first texture associated with a surface of the object on the basis of a first correspondence relationship and including first color information, a second texture associated with the surface of the object on the basis of a second correspondence relationship and including second color information, and a third texture associated with the surface of the object on the basis of a third correspondence relationship and including height information;
control a line-of-sight direction of a virtual camera placed in the virtual space; and
determine a rendering color by blending (a) at least the first color information, of the first texture corresponding to the surface of the object, obtained on the basis of the first correspondence relationship and (b) the second color information, of the second texture corresponding to the surface of the object, obtained on the basis of a corrected correspondence relationship obtained by correcting the second correspondence relationship through correction based on the height information specified on the basis of a relationship between the line-of-sight direction of the virtual camera and orientation of the surface of the object and the third correspondence relationship; and
render the surface of the object.

7. The image processing apparatus according to claim 6, wherein the second color information is obtained by shifting a position in the second texture that is referred to in the rendering, from a position specified on the basis of the second correspondence relationship to a position further shifted on the basis of the correction.

8. The image processing apparatus according to claim 7, wherein a shift direction and a shift amount in and by which the position in the second texture that is referred to in the rendering is shifted are determined on the basis of a relative relationship between the line-of-sight direction of the virtual camera and the orientation of the surface of the object.

9. The image processing apparatus according to claim 8, wherein the shift amount is determined such that the shift amount is decreased as the line-of-sight direction of the virtual camera is closer to a direction opposite to a normal direction of the surface of the object.

10. The image processing apparatus according to claim 6, wherein the processor is further configured to control the information processing apparatus to:

place a virtual light source in the virtual space; and
in the rendering,
determine the rendering color by combining at least the first color information and the second color information at a predetermined ratio, and
determine the rendering color such that a proportion of the second color information is higher when the light source is located on a back side of the surface of the object than when the light source is located on a surface side of the object.

11. An image processing system for rendering an object placed in a virtual space, the image processing system comprising:

a processor and a memory coupled thereto, the processor being configured to control the information processing system to at least perform operations comprising:
managing a first texture associated with a surface of the object on the basis of a first correspondence relationship and including first color information, a second texture associated with the surface of the object on the basis of a second correspondence relationship and including second color information, and a third texture associated with the surface of the object on the basis of a third correspondence relationship and including height information;
controlling a line-of-sight direction of a virtual camera placed in the virtual space; and
determining a rendering color by blending (a) at least the first color information, of the first texture corresponding to the surface of the object, obtained on the basis of the first correspondence relationship and (b) the second color information, of the second texture corresponding to the surface of the object, obtained on the basis of a corrected correspondence relationship obtained by correcting the second correspondence relationship through correction based on the height information specified on the basis of a relationship between the line-of-sight direction of the virtual camera and orientation of the surface of the object and the third correspondence relationship; and rendering the surface of the object.

12. The image processing system according to claim 11, wherein the second color information is obtained by shifting a position in the second texture that is referred to in the rendering, from a position specified on the basis of the second correspondence relationship to a position further shifted on the basis of the correction.

13. The image processing system according to claim 12, wherein a shift direction and a shift amount in and by which the position in the second texture that is referred to in the rendering is shifted are determined on the basis of a relative relationship between the line-of-sight direction of the virtual camera and the orientation of the surface of the object.

14. The image processing system according to claim 13, wherein the shift amount is determined such that the shift amount is decreased as the line-of-sight direction of the virtual camera is closer to a direction opposite to a normal direction of the surface of the object.

15. The image processing system according to claim 11, wherein the processor is further configured to control the information processing system to:

place a virtual light source in the virtual space; and in the rendering, determine the rendering color by combining at least the first color information and the second color information at a predetermined ratio, and determine the rendering color such that a proportion of the second color information is higher when the light source is located on a back side of the surface of the object than when the light source is located on a surface side of the object.

16. An image processing method executed by a processor of an image processing apparatus for rendering an object placed in a virtual space, the image processing method comprising:

managing a first texture associated with a surface of the object on the basis of a first correspondence relationship and including first color information, a second texture associated with the surface of the object on the basis of a second correspondence relationship and including second color information, and a third texture associated with the surface of the object on the basis of a third correspondence relationship and including height information;

controlling a line-of-sight direction of a virtual camera placed in the virtual space; and determining a rendering color by blending (a) at least the first color information, of the first texture corresponding to the surface of the object, obtained on the basis of the first correspondence relationship and (b) the second color information, of the second texture corresponding to the surface of the object, obtained on the basis of a corrected correspondence relationship obtained by correcting the second correspondence relationship through correction based on the height information specified on the basis of a relationship between the line-of-sight direction of the virtual camera and orientation of the surface of the object and the third correspondence relationship and;

rendering the surface of the object.

17. The image processing method according to claim 16, wherein the second color information is obtained by shifting a position in the second texture that is referred to in the rendering, from a position specified on the basis of the second correspondence relationship to a position further shifted on the basis of the correction.

18. The image processing method according to claim 17, wherein a shift direction and a shift amount in and by which the position in the second texture that is referred to in the rendering is shifted are determined on the basis of a relative relationship between the line-of-sight direction of the virtual camera and the orientation of the surface of the object.

19. The image processing method according to claim 18, wherein the shift amount is determined such that the shift amount is decreased as the line-of-sight direction of the virtual camera is closer to a direction opposite to a normal direction of the surface of the object.

20. The image processing method according to claim 16, further causing the processor to:

place a virtual light source in the virtual space; and in the rendering, determine the rendering color by combining at least the first color information and the second color information at a predetermined ratio, and determine the rendering color such that a proportion of the second color information is higher when the light source is located on a back side of the surface of the object than when the light source is located on a surface side of the object.

\* \* \* \* \*